(12) United States Patent
Gemmeke et al.

(10) Patent No.: US 7,962,538 B2
(45) Date of Patent: Jun. 14, 2011

(54) METHOD OF OPERAND WIDTH REDUCTION TO ENABLE USAGE OF NARROWER SATURATION ADDER

(75) Inventors: Tobias Gemmeke, Boeblingen (DE); Jens Leenstra, Bosdorf (DE); Nicolas Maeding, Holzgertingen (DE); Kerstin Schelm, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 11/560,165

(22) Filed: Nov. 15, 2006

(65) Prior Publication Data

US 2007/0180016 A1    Aug. 2, 2007

(30) Foreign Application Priority Data

Dec. 21, 2005   (DE) .................................. 051 12 559

(51) Int. Cl.
*G06F 7/00*    (2006.01)
*G06F 15/00*   (2006.01)
*G06F 7/50*    (2006.01)
*G06F 7/38*    (2006.01)

(52) U.S. Cl. .................... 708/203; 708/550; 708/700

(58) Field of Classification Search .................... None
See application file for complete search history.

(56) References Cited

U.S. PATENT DOCUMENTS

| | | | | |
|---|---|---|---|---|
| 4,819,198 | A * | 4/1989 | Noll et al. ................. | 708/710 |
| 5,623,423 | A * | 4/1997 | Lipovski .................. | 708/203 |
| 5,835,782 | A * | 11/1998 | Lin et al. ................. | 712/42 |
| 6,732,126 | B1 * | 5/2004 | Wang ....................... | 708/232 |

* cited by examiner

*Primary Examiner* — Lewis A Bullock, Jr.
*Assistant Examiner* — Kevin Hughes
(74) *Attorney, Agent, or Firm* — Cantor Colburn LLP; Steven Chiu

(57) ABSTRACT

An electronic computing circuit for implementing a method for reducing the bit width of two operands from a bit length N to a reduced bit length M, thus, M<N. To enable a wider re-usage of existing designs or building blocks being all specialized to the usual bit length of a power of 2 (8, 16, 32, 64 etc.), the chip structure of which is already highly optimized in regard of speed and space savings, a circuit is implemented as an addend width reduction circuit to perform the steps of: receiving said two N-bit operands as an input, adding the (N−M+1) most significant bits of said two N-bit operands separately in an auxiliary adder logic, calculating at least the two most significant bits of reduced-bit-length output operands in a decision logic processing the add result of said auxiliary adder logic, such that a predetermined post-processing can be correctly performed with said output operands.

15 Claims, 7 Drawing Sheets

| VMA-RES | $a_M$ | $a_{M-1}$ | $a_{M-2} .. a_0$ | $b_M$ | $b_{M-1}$ | $b_{M-2} .. b_0$ | COMMENTS |
|---|---|---|---|---|---|---|---|
| < -2 | 1 | 0 | $s_{M-2} .. s_0$ | 1 | 0 | $c_{M-2} .. c_0$ | PRE_SAT-DOWN |
| -2 | 1 | $s_{M-1}$ | $s_{M-2} .. s_0$ | 1 | $c_{M-1}$ | $c_{M-2} .. c_0$ | PRE_SAT-DOWN |
| -1 | $s_M$ | $s_{M-1}$ | $s_{M-2} .. s_0$ | $c_M$ | $c_{M-1}$ | $c_{M-2} .. c_0$ | UNCHANGED VALUES |
| 0 | 0 | 0 | $s_{M-2} .. s_0$ | 0 | $c_{M-1}$ | $c_{M-2} .. c_0$ | UNCHANGED VALUES |
| >0 | 0 | 0 | $s_{M-2} .. s_0$ | 0 | 1 | $c_{M-2} .. c_0$ | PRE_SAT-UP |

FIG. 5

| 71 → VMA-RES | 72 → $a_M$ | 73 → $a_{M-1}$ | 74 → $a_{M-2}..a_0$ | 75 → $b_M$ | 76 → $b_{M-1}$ | 77 → $b_{M-2}..b_0$ | 78 → COMMENTS |
|---|---|---|---|---|---|---|---|
| 0 | $S_M$ | $S_{M-1}$ | $S_{M-2}..S_0$ | $C_M$ | $C_{M-1}$ | $C_{M-2}..C_0$ | UNCHANGED VALUES |
| 1 | 1 | $S_{M-1}$ | $S_{M-2}..S_0$ | 0 | $C_{M-1}$ | $C_{M-2}..C_0$ | UNCHANGED VALUES |
| ≥2 | 1 | $S_{M-1}$ | $S_{M-2}..S_0$ | 1 | $C_{M-1}$ | $C_{M-2}..C_0$ | PRE_SAT-UP |

METHOD OF OPERAND WIDTH REDUCTION TO ENABLE USAGE OF NARROWER SATURATION ADDER

BACKGROUND OF THE INVENTION

1. Field of the Invention

The present invention lies within the field of computer chip design. More particularly, it relates to an electronic computing circuit for implementing a method for reducing the bit width of two operands from a bit length N to a reduced bit length M, thus, M<N.

2. Description and Disadvantages of Prior Art

Above methods are frequently used in prior art saturation arithmetics, wherein a plurality of operands having a standard bit width of e.g. 32 bit are added. In these cases, intermediate results exist having a bit width of more than 32 bit, for example of 35 bit. Prior art saturation arithmetic usually first reduces the plurality of 32 bit input operands to two operands of such increased bit width (35 bit), and then adds the 35 bit operands in a particular 35 bit adder device. Such adder device adds up the two operands and saturates the result to a bit length which is again smaller than that of the input operands and which mostly corresponds to a standard bit length like e.g. 32 bit. An example of a saturated adder device is disclosed in the European patent application no. 0,209,014 B1. A disadvantage of the procedure disclosed there is that an adder device must be used which is adapted to process input operands having a bit length of other than a power of two. In the example above this was 35. Although this is not a severe problem to construct a 35 bit adder, such adder unit needs to be designed and must be optimised for speed, for space and for the special operand type in use. This especially applies for so-called single-instruction-multiple-data (SIMD) operations. The data width in these units is variable and depends on the instruction in use. The common widths are by the power of two, like 8, 16, 32, 64 etc. Operands and results are always of this width.

The usual prior art approach is to accept the complexity of the operands having a bit length exceeding the powers of two and to build for each individual bit width building blocks on a chip which are capable to operate with the locally required operand widths resulting in many such building blocks. This is sketched in FIG. 1.

With special reference to FIG. 1 a schematic block diagram representation of a prior art chip design architecture is shown processing a "Sum across Instruction" having five 32 bit input operands 10, including a prior art 3:2 compression stage 12 and a subsequent 4:2 compression stage 14, which generates two output operands of each 35 bit. These 35-bit operands are then added in a circuit 16 in order to yield a 32-bit add result. Circuit 16 is shown to comprise a 35 bit vector merging adder 17 (VMA) as input stage, which adds up the two operands from stage 14. A 35-bit sum and the carry of the most significant bit are output from unit 17 to a saturation circuit 19, which calculates a 32-bit saturated add result based on the carry bit and the 35-bit sum.

By that the additional complexity and very heterogeneous micro architecture of such a design is accepted, which tends to render the resulting chip structure quite complex. In addition, this prior art approach disables a wider re-usage of existing designs or building blocks being all specialised to the usual bit length of a power of 2 (8, 16, 32, 64 etc.), the chip structure of which is already highly optimised in regard of speed and space savings.

OBJECTIVES OF THE INVENTION

It is thus an objective of the present invention to provide an improved method and system for reducing the bit width of two operands from a bit length N to a reduced bit length M.

SUMMARY AND ADVANTAGES OF THE INVENTION

This objective of the invention is achieved by the features stated in enclosed independent claims. Further advantageous arrangements and embodiments of the invention are set forth in the respective dependent claims. Reference should now be made to the appended claims.

According to the broadest aspect of the invention a method for reducing the bit width of two operands from a bit length N to a reduced bit length M is disclosed which comprises to receive said two N-bit operands as an input, and which is characterized by the steps of adding the (N−M+1) most significant bits of the two N-bit operands separately in an auxiliary adder logic, calculating at least the two most significant bits of reduced-bit-length output operands in a decision logic processing the add result of said auxiliary adder logic such that a predetermined post-processing can be correctly performed with said output operands.

As to the device-related aspect of the present invention an electronic computing circuit is disclosed processing two N-bit input operands of a bit length N and generating two M-bit output operands of a reduced bit length M, having means for receiving the two N-bit operands as an input, which is characterized by means for adding the (N−M+1) most significant bits of the two N-bit operands separately in an auxiliary adder logic, and a decision logic processing the add result of said auxiliary adder logic for calculating at least the two most significant bits of reduced-bit-length output operands from the (N−M+1) most significant bits of the two N-bit operands such that a predetermined post-processing can be correctly performed with said M-bit output operands.

The inventive idea thus comprises to provide an additional logic—an addend width reduction circuit (denoted 20 in FIG. 2)—additional to a standard post processing logic having a standard bit length of a power of two—which additional logic converts the wider operands having a bit length of larger than the preceding power of two, in such a way that the operands provided to the post-processing circuit have the desired bit width of this post processing circuit and that the operands are prepared in such a way that the calculated saturated or compressed result of this narrower operation is equal to the saturated result of the post-processing circuit which would calculate the result on the wider operands.

This principle enables for the re-usage of commonly used, pre-optimised post processing circuits, for example an adder, an add/multiply operation circuit, a general address calculation circuit, etc., while minimising the additional design effort required. The savings obtained in free development capacity can thus be focussed on further improvement of the standard bit length post processing circuits. Any improvements achieved with those standard circuits pay off for all the non-conform operations implemented in the inventive pre-processing part.

The before-mentioned decision logic handles preferably three cases of the auxiliary add result:
a) result<=−2,
b) result>=0,
c) result=−1.

When the before-mentioned post-processing is a saturated add operation, then embodiments of the present invention cover many use cases of graphics processing, when e.g., the setting of some inputs is limited to a given maximum value. Other uses are post-processings of Multiply and Multiply-Add operations.

Further, advantageous uses are cases, wherein the parameter N is just a little bit larger than the next lower power of 2, e.g., 17, 18; or 33, 34, 35, 36, 37; 65, 66, ... 75. In these cases the inventive circuits are tolerably small.

Nevertheless the inventive principle is very general in nature and can thus be used for any choices of N and M parameters, including exotic cases like N being far larger than the preceding power of 2, e.g., M=32, and N=62.

Further, the inventive method and system can be used for unsigned or signed operands in either, 1-er complement or 2-complement representation.

In any case the addition of the (N−M+1) most significant bits and the decision logic, i.e. the detection of different cases and derivation of modification of the output numbers, can be combined to reduce the total logic. Such reduction can be performed for example automatically using prior art synthesis tools.

BRIEF DESCRIPTION OF THE DRAWINGS

Embodiments of the present invention are illustrated by way of example and is not limited by the shape of the Figures of the drawings in which:

FIG. 5 is a table representation illustrating different combinations of the bit settings of the output operands, and the respective VMA result in a 2-complement implementation;

FIG. 7 is a depiction according to FIG. 5 for a different implementation.

DETAILED DESCRIPTION OF THE PREFERRED EMBODIMENT

Figure 1:
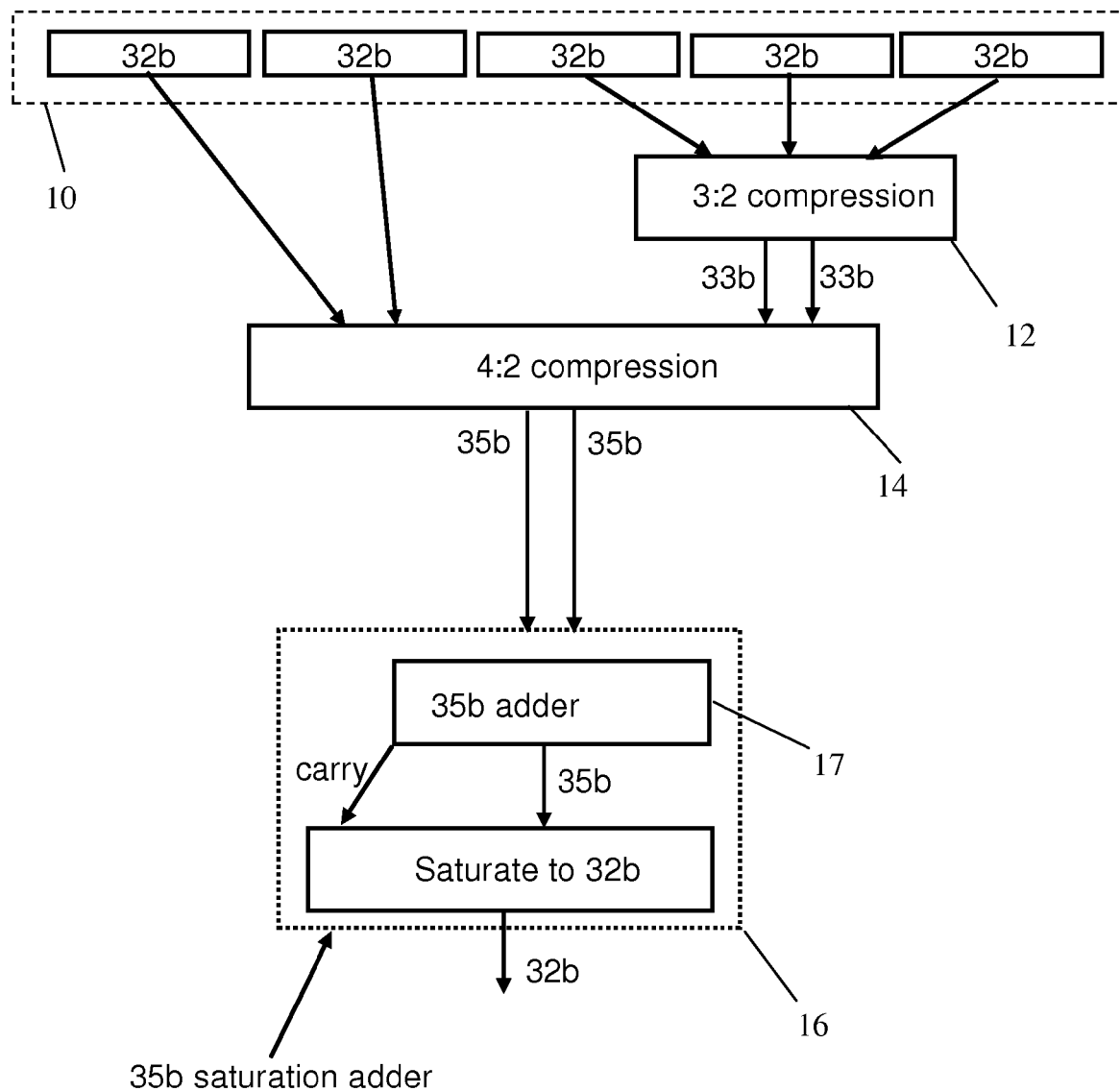
FIG. 1 is a schematic block diagram representation of a prior art chip design architecture processing a "Sum across Instruction" having five 32 bit input operands, including a 3:2 and a subsequent 4:2 compression stage and the subsequent 35-bit adding in a respective 35 bit saturation adder.
Figure 2:
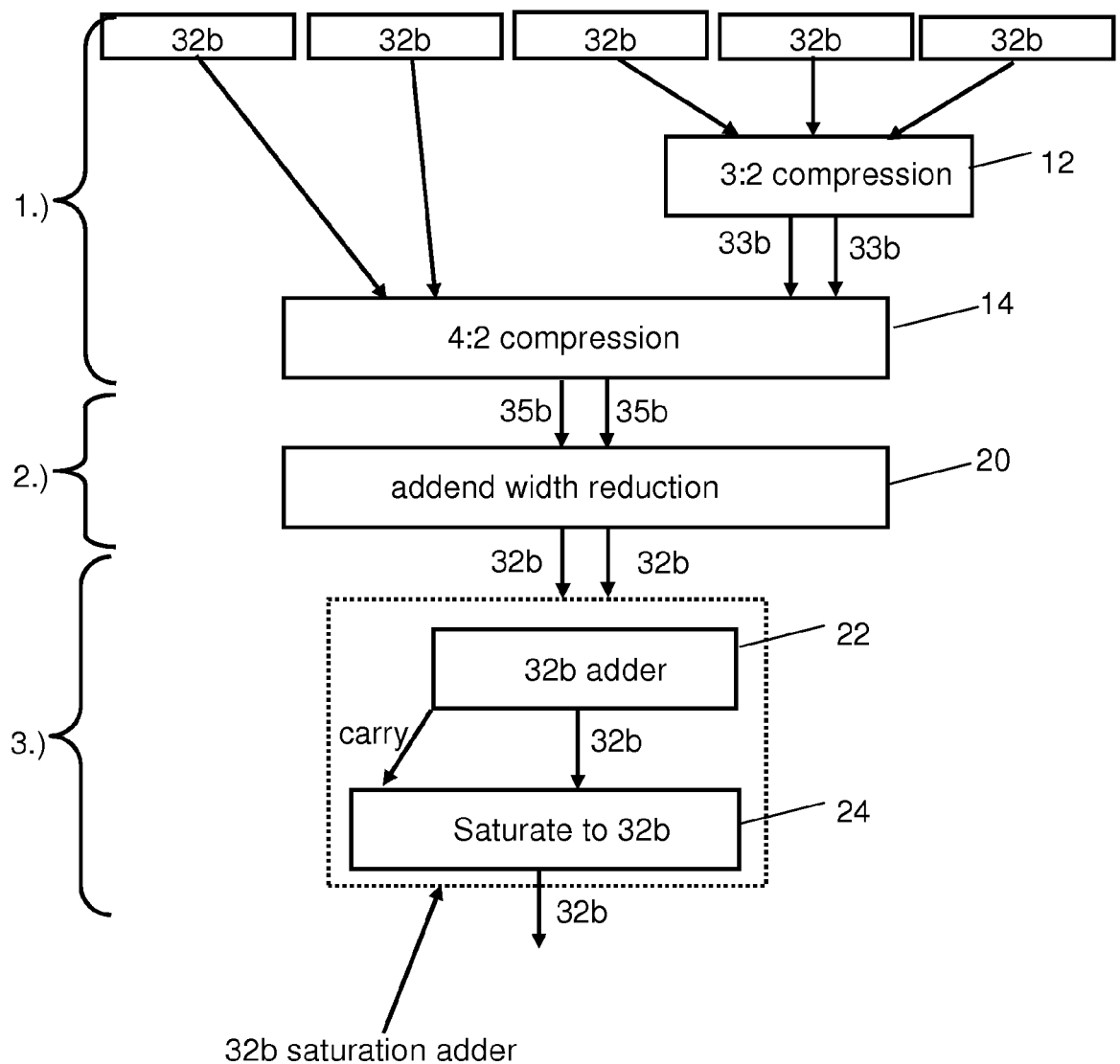
FIG. 2 is a schematic block diagram representation corresponding to FIG. 1 illustrating the principle way to use the method and circuits of embodiments of the present invention.
Figure 6:
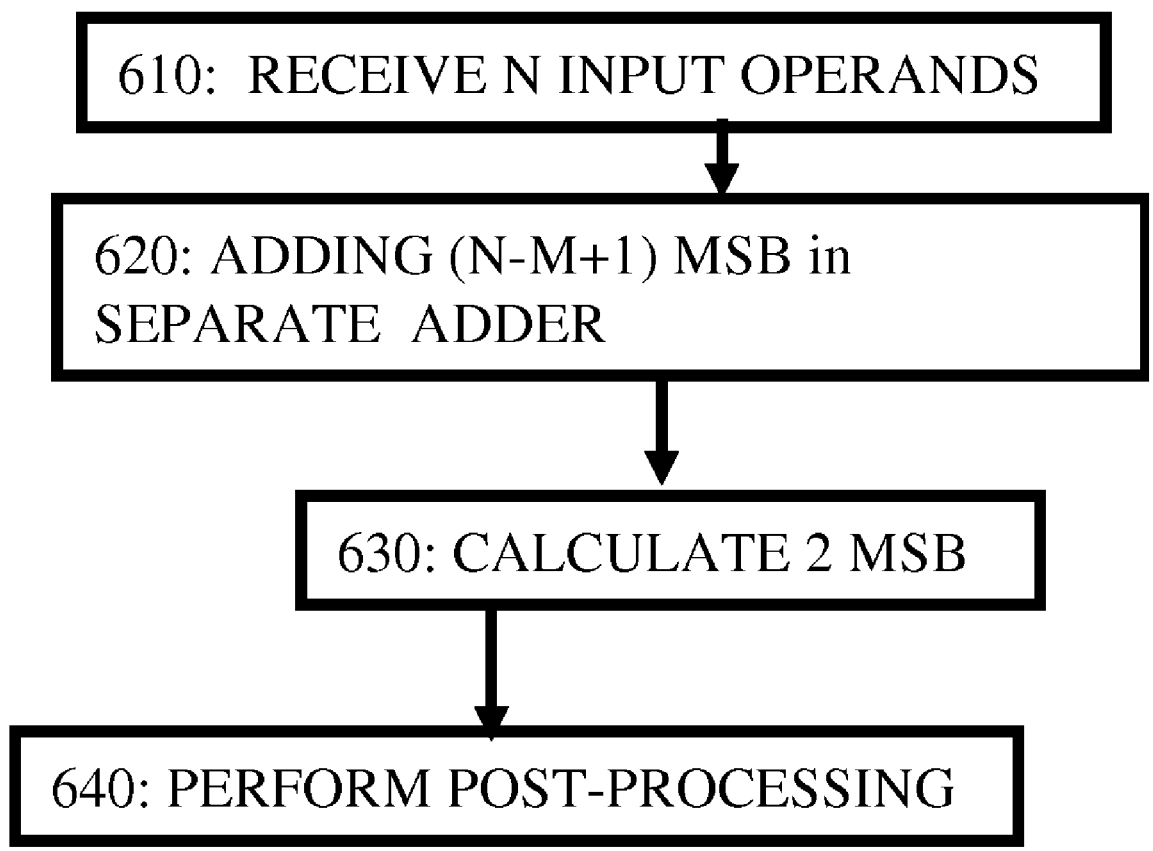
FIG. 6 is a control flow diagram of the inventive method when used for above saturation adders.

With general reference to the Figures and with special reference now to FIG. 2 and FIG. 6 a schematic block diagram representation of an inventive chip design architecture and the respective control flow in FIG. 6 is shown processing the "Sum across Instruction" from FIG. 1, having five 32 bit input operands 10, for receiving the N-bit input operands in a step 610, including a prior art 3:2 compression stage 12 and a subsequent 4:2 compression stage 14, which generates two output operands of each 35 bit. In so far the same is done as in prior art.

According to this inventive embodiment the two 35-bit operands output from 4:2 compression stage 14 are then pre-processed, however, in a circuit 20 representing the core of this embodiment of the present invention. The advantageous difference to FIG. 1 is that in FIG. 2 a standard 32-bit adder 22 can be used for the further processing. The design of this adder 22 can be taken from a library where it is present in an optimized form. Thus, a 35-bit adder 17 need not be designed and optimized according to this inventive embodiment.

The pre-optimized standard adder 22 produces a 32-bit sum and a 1-bit carry which is then saturated in a saturation stage 24 to yield a 32 bit add result.

Figure 3:
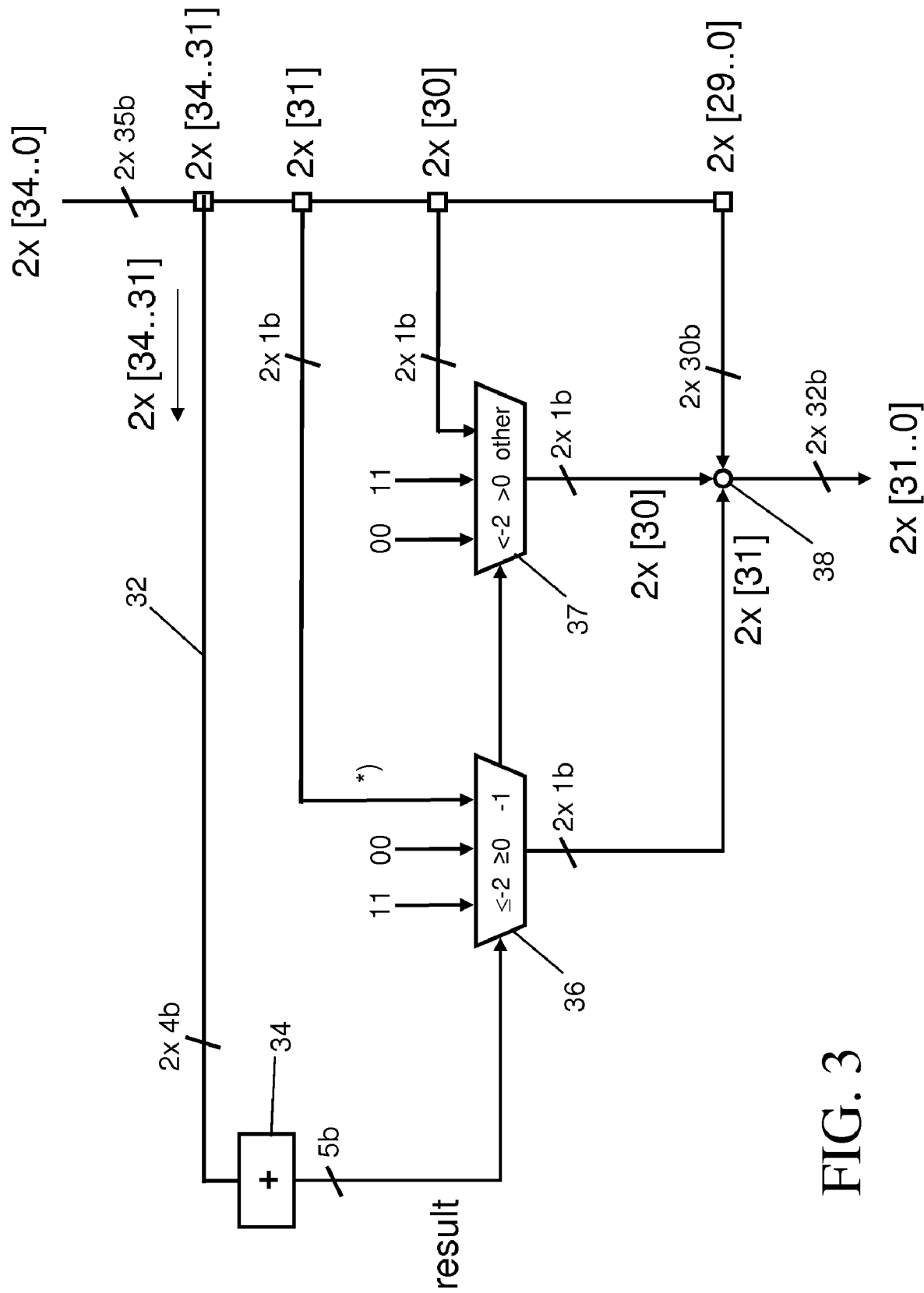
FIG. 3 is a zoom view into the box 20 of the circuit in FIG. 2 illustrating a first circuit alternative of a preferred embodiment of the present invention.

FIG. 3 is a zoom view into the box 20 of the circuit in FIG. 2 illustrating a first circuit alternative of a preferred embodiment of the present invention in the use case of FIGS. 1 and 2;

With reference to FIG. 3 and FIG. 6 the inventive circuit 20 receives in a step 610 two 35-bit long input operands, as depicted at the top of FIG. 3. In this embodiment the bit wires of both operands are treated in the same way which is depicted in the drawing by the symbols "2X", i.e. their specific sequence is not relevant for the further processing.

In a first branch 32 the four most significant bits, in this example the bits 34, 33, 32 and 31, of both input operands are added in a step 620 in a separate, auxiliary adder 34. The 5-bit long result is fed into a first multiplexer 36 which is programmed to generate two certain, predefined output bits in dependence of a respective value of the add result from adder 34.

Multiplexer 36 has three input ports, the first having forced bit values of "11", the second bit values of "00" and the third having the bits 31 of both operands in an unchanged form. When the add result from adder 34 is less or equal to −2, then the first "11" input is selected for the multiplexer output. In the case, the add result is greater or equal to zero, the input bit pair "00" is selected for output, and if the add result is equal to −1, then the bit pair 31 is selected for output. The output is fed into a node 38. Thus, the bits 31 of the output value in output register 38 are calculated from multiplexer 36 and adder 34.

The two bits 30 of the output of the circuit in FIG. 3 are calculated by a multiplexer 37. The control input for multiplexer 37 is also the add result 34.

The multiplexer 37 has three input ports, each comprising 2 bits, like multiplexer 36. If the add result from adder 34 is less than −2, the input bit pair "00" is selected for output. If the add result is greater zero then the input bit pair "11" is selected for output, whereas in all other cases the bit pair 30 of the input operands are selected from the input chain of the circuit to be directly selected for being the output bits 30.

Thus, the two most significant bits are calculated in a step 630 in the two multiplexer circuits 36 and 37.

Bits 29 ... 0 of the input operands are directly fed through without to be changed from the input to the output of this circuit. Thus, in the end, the output register 38 comprises two 32-bit long output operands of which bits 0 ... 29 are identical to the respective input bits, whereas bits 30 are selected from multiplexer 37; and bits 31 are selected from multiplexer 36.

A person skilled in the art may appreciate that box 20 in FIG. 2 performs an addend width reduction from 35 bits to 32 bits for both operands according to a predefined scheme implemented according to the calculation rules of the multiplexers 36 and 37 in FIG. 3. Then any post-processing may be continued with, see step 640.

Figure 4:
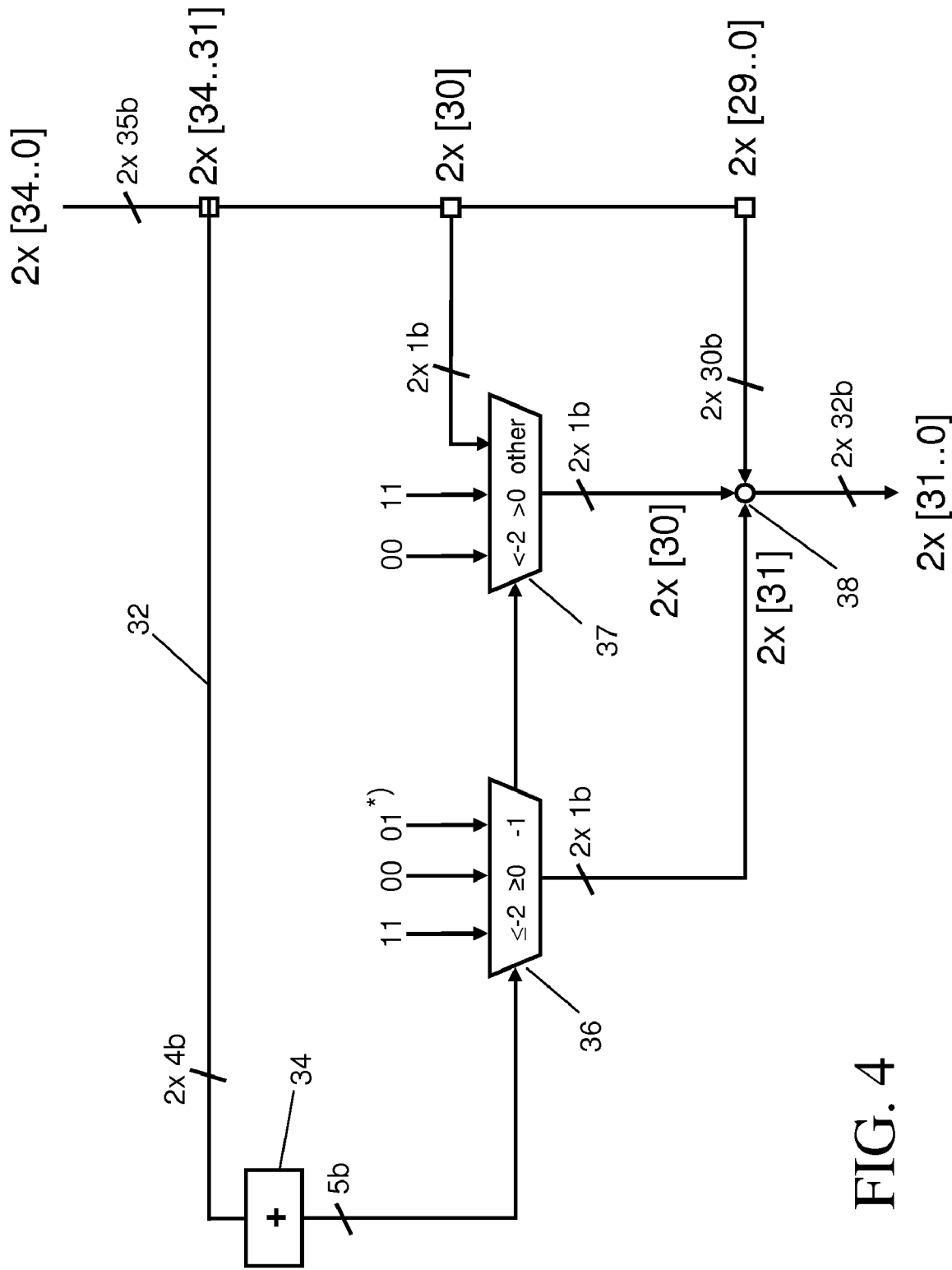
FIG. 4 is a zoom view into the box 20 of the circuit in FIG. 2 illustrating a second circuit alternative of a preferred embodiment of the present invention.

With reference next to FIG. 4 an alternative implementation for FIG. 3 is given in order to illustrate that various other implementations may also be used for the present use case. In this alternative circuit scheme the difference to the circuit in FIG. 3 is that the third input port of multiplexer 36 is fixedly predefined like the bit values present at the two first input ports. The bit setting at the third input port is "01" the rest of the circuit is identical to the embodiment described with reference to FIG. 3.

FIG. 5 is a table representation illustrating row-wise different combinations of the bit settings of the output operands in columns 52, 53, 55 and 56 in the foregoing use case, and the respective VMA result of adder 34 in column 51 in a 2-complement implementation of the circuits described before.

Column 54 and column 57 comprise respective lower significant bits of the output operands (A being a sum and B being used as a carry value in a subsequent calculation. Column 58 indicates comments relating to the effect of the inventive circuit 20 in FIGS. 2, 3 and 4.

The columns 52 and 55 comprise values being output from multiplexer 36, whereas columns 53 and 56 comprise the output values of multiplexer 37. In the first row a VMA result smaller than −2 results in $A_{31}=1$, $B_{31}=1$, $A_{30}=0$ and $B_{30}=0$. The lower significant bits of the sum and carry operands remain unchanged. The circuit executes a pre-saturate down function, i.e. the output is set in such a way the following saturate adder will saturate the final result to the predefined minimal value.

The further rows of VMA result being equal to −2, −1, 0, and greater than 0, respectively, can be interpreted likewise.

FIG. 7 shows a further implementation variant for unsigned operands.

A post-processing can take place in any form and by intervention of further circuits or units. Thus, the post-processing needs not necessarily be implemented immediately after the values are present at node 38. Instead, the values may also be written back into memory, or stored intermediately in latches, etc., or transferred to another unit, if ever required, and can then be later post-processed.

The invention claimed is:

1. A circuit comprising:
    an electronic computing circuit for processing two N-bit input operands of a bit length N and generating two M-bit output operands of a reduced bit length M, where M<N, the electronic computing circuit comprising:
    means for receiving said two N-bit operands as an input;
    means for adding the (N−M+1) most significant bits of said two N-bit operands in an auxiliary adder logic;
    a decision logic processing the add result of said auxiliary adder logic for calculating at least the two most significant bits of reduced-bit-length output operands such that a predetermined post-processing can be correctly performed with said M-bit output operands, wherein the add result is a signed integer;
    wherein said decision logic sets the MSB of the output operands to 1 when the auxiliary adder result is less than or equal to −2, 0 when the auxiliary adder result is greater than or equal to 0, and propagates the Nth-bit of the input when the auxiliary adder result is equal to −1; and
    wherein said decision logic sets the second MSB of the output operands to 0 when the auxiliary adder result is less than −2, 1 when the auxiliary adder result is greater than 0, and propagates the (N−1)th-bit of the input when the auxiliary adder result is between and inclusive of 0 and −2.

2. The circuit according to claim 1 wherein said means for adding the (N−M+1) most significant bits and said decision logic are implemented within a single unit.

3. A computer implemented method comprising:
    in an electronic circuit, reducing the bit width of two operands from a bit length N to a reduced bit length M, where M<N, the reducing comprising:
    receiving said two N-bit operands as an input at an electronic circuit;
    adding the (N−M+1) most significant bits of said two N-bit operands separately in an auxiliary adder logic circuit;
    calculating at least the two most significant bits of reduced-bit-length output operands such that a predetermined post-processing can be correctly performed with said output operands, wherein the add result is a signed integer and the calculating is performed by a decision logic circuit;
    wherein said decision logic circuit sets the MSB of the output operands to 1 when the auxiliary adder result is less than or equal to −2, 0 when the auxiliary adder result is greater than or equal to 0, and propagates the Nth-bit of the input when the auxiliary adder result is equal to −1; and
    wherein said decision logic circuit sets the second MSB of the output operands to 0 when the auxiliary adder result is less than −2, 1 when the auxiliary adder result is greater than 0, and propagates the (N−1)th-bit of the input when the auxiliary adder result is between and inclusive of 0 and −2.

4. The method according to claim 3, wherein the electronic circuit, the auxiliary adder logic, and the decision logic circuit are implemented within a single unit.

5. The method according to claim 3, wherein said post-processing is an add operation.

6. The method according to claim 3, wherein said post-processing is a saturated add operation.

7. The method according to claim 3, wherein said post-processing is a multiply-add operation.

8. The method according to claim 3, wherein said post processing is performed with a bit length M being a power of 2.

9. The method according to claim 3, wherein the predetermined post-processing is done independently of the auxiliary adder logic and the decision logic.

10. A computer system comprising:
    an electronic computing circuit for processing two N-bit input operands of a bit length N and generating two M-bit output operands of a reduced bit length M, where M<N, the electronic computing circuit comprising:
    means for receiving said two N-bit operands as an input;
    means for adding the (N−M+1) most significant bits of said two N-bit operands in an auxiliary adder logic;
    a decision logic processing the add result of said auxiliary adder logic for calculating at least the two most significant bits of reduced-bit-length output operands such that a predetermined post-processing can be correctly performed with said M-bit output operands, wherein the add result is a signed integer;
    wherein said decision logic sets the MSB of the output operands to 1 when the auxiliary adder result is less than or equal to −2, 0 when the auxiliary adder result is greater than or equal to 0, and propagates the Nth-bit of the input when the auxiliary adder result is equal to −1; and
    wherein said decision logic sets the second MSB of the output operands to 0 when the auxiliary adder result is less than −2, 1 when the auxiliary adder result is greater than 0, and propagates the (N−1)th-bit of the input when the auxiliary adder result is between and inclusive of 0 and −2.

11. The computer system according to claim 10 wherein said means for adding the (N−M+1) most significant bits and said decision logic are implemented within a single unit.

12. The computer system according to claim 10 wherein said decision logic comprises means for handling the following three cases of the auxiliary add result using a multiplexer:
 a) <=−2,
 b) >=0,
 c) =−1.

13. The computer system according to claim 10 wherein said predetermined post-processing can be correctly performed with said M-bit output operands wherein M is a power of 2.

14. The computer system according to claim 10 wherein said predetermined post-processing can be correctly performed with said M-bit output operands using a multiply-add operation.

15. The computer system according to claim 10 wherein said predetermined post-processing can be correctly performed with said M-bit output operands using a saturated add operation.

* * * * *